O. JUNGGREN.
THRUST BEARING.
APPLICATION FILED SEPT. 13, 1907.

963,155.

Patented July 5, 1910.

WITNESSES
W. Ray Taylor.
J. Ellis Glen.

INVENTOR
OSCAR JUNGGREN.
by Albert G. Davis
ATT'Y.

UNITED STATES PATENT OFFICE.

OSCAR JUNGGREN, OF SCHENECTADY, NEW YORK, ASSIGNOR TO GENERAL ELECTRIC COMPANY, A CORPORATION OF NEW YORK.

THRUST-BEARING.

963,155. Specification of Letters Patent. Patented July 5, 1910.

Application filed September 13, 1907. Serial No. 392,610.

*To all whom it may concern:*

Be it known that I, OSCAR JUNGGREN, a citizen of the United States, residing at Schenectady, county of Schenectady, State of New York, have invented certain new and useful Improvements in Thrust-Bearings, of which the following is a specification.

The present invention relates to thrust bearings, and more particularly to those intended to limit the endwise movement of horizontal shafts in elastic fluid turbines, and has for its object to provide a thrust bearing of improved construction which shall be effective and reliable in operation.

Figure 1:
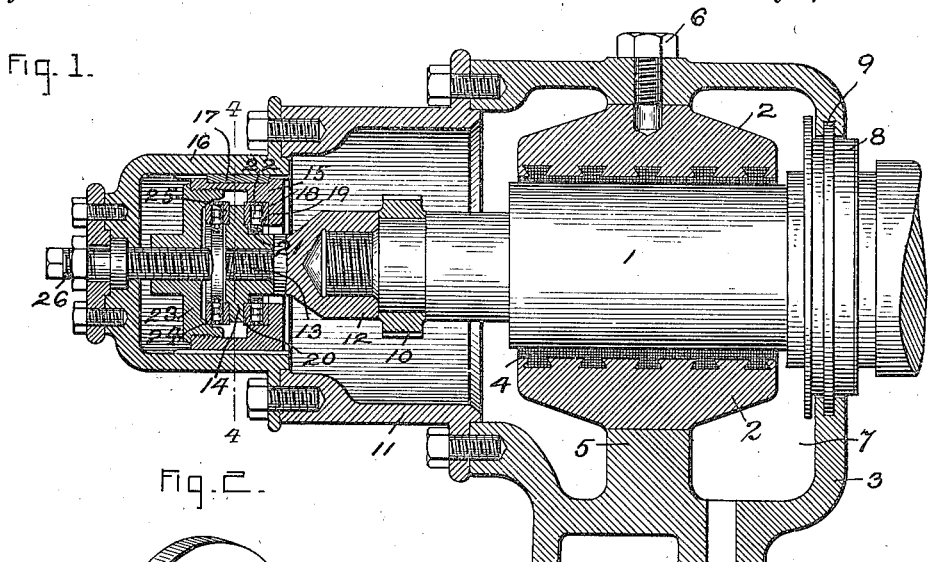
Figure 2:
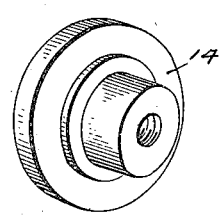
Figure 3:
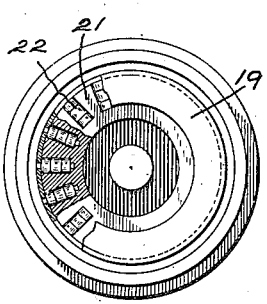
Figure 4:
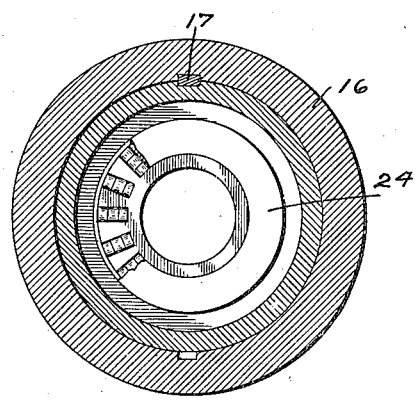

In the accompanying drawing, which represents one of the embodiments of my invention, Figure 1 is a longitudinal section of a turbine shaft with its main and thrust bearings; Fig. 2 is a perspective view of the thrust member carried by the shaft; Fig. 3 is a detail view, partly in section, of one of the roller thrust bearings; and Fig. 4 is a section taken on the line 4—4 of Fig. 1 with the thrust member and its associated parts on the end of the shaft omitted.

1 indicates the main shaft, which is supported by upper and lower bearing blocks 2 carried by the pillow-block 3. The blocks are provided with a lining 4 of Babbitt or other suitable material. It will be noted that, whereas the blocks are comparatively long, the annular support 5 therefor on the pillow-block is comparatively short. The object of this arrangement is to provide for a limited amount of self-adjustment to compensate for any slight inaccuracy in alinement. The blocks are prevented from turning with the shaft by the lower end of screw 6. Surrounding the blocks is a chamber 7 containing lubricant, and the latter is prevented from escaping through the clearance around the shaft by the oil-throwing device 8, comprising parallel projections 9, one of which enters a groove in the pillow-block extending perpendicularly to the shaft, and the other of which extends perpendicularly to the shaft just inside of the wall of the chamber. On one end of the shaft is a worm 10 meshing with a wheel on the governor shaft (not shown) whose axle is perpendicular to that of the main shaft. Surrounding the worm is a casing 11 which is directly bolted to the pillow-block. When the governor shaft is driven by some other means, the worm 10 and the casing 11 may be omitted. The worm is held on the shaft by a nut 12, which nut is provided with a screw 13 to hold the flanged part 14, forming the thrust member, in place.

Surrounding the thrust member is an annulus 15 that makes a sliding fit with the bore of the casing 16. This annulus is prevented from turning by the spline 17, the latter moving in a groove formed in the casing 16. The annulus is provided with a shoulder 18 on which is seated a hard steel ring or washer 19. The thrust member is similarly provided with a shoulder and a hardened steel ring 20. Between the rings is a carrier 21 containing a plurality of radially disposed rollers 22. The left-hand end of the annulus is threaded internally to receive a nut 23, the latter being provided with a shoulder to receive the hardened steel ring 24. The adjacent side of the thrust member is also provided with a shoulder to receive a hardened steel ring 25, and between the rings or washers is a carrier containing a plurality of rollers, similar to that shown in Fig. 3. It will thus be seen that the thrust of the shaft in one direction is taken care of by one set of rollers, and that in the opposite direction by the second set of rollers. The annulus and the nut are moved longitudinally with the shaft by the adjusting screw 26, which is secured to the casing against longitudinal movement but is free to turn. Owing to the fact that the nut is threaded to the annulus, any change in its position with respect to the latter will increase or decrease the clearance between the rollers and the thrust member, while any adjustment of the screw 26 will shift the shaft 1 bodily in one direction or the other, depending upon the direction of rotation of the screw.

When the worm and its casing are omitted, the casing of the thrust bearing can be mounted directly on the pillow-block.

Since the thrust bearings are located at the end of the machine, they are readily accessible, and the parts can be taken down or assembled without in any way interfering with the turbine or other apparatus connected to the main shaft. Since the interiors of the casings 11 and 16 are in communication with the oil chamber surrounding the main bearing, it follows that the parts will be well lubricated, and this without any special attention on the part of the attendant. By measuring the distance between some portion of the shaft and the pillow-block 3, the attendant can readily determine whether or not the shaft is running in its proper position, and if not, can easily adjust it by rotating the adjusting screw 26, and this without opening or in any way interfering with the remaining portions of the apparatus.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means.

What I claim as new, and desire to secure by Letters Patent of the United States, is,—

1. In combination, a shaft, a thrust member attached thereto, an annulus inclosing said member provided with a thrust receiving surface, a nut threaded to the annulus and provided with a thrust receiving surface, anti-friction devices between said member and said surfaces, a cylindrical casing in which the annulus is slidably mounted for axial movement, a splined connection between the casing and the annulus, and a screw-threaded means for moving the nut and annulus axially to adjust the position of the shaft in either direction and to maintain said adjustment.

2. In combination, a shaft, a thrust member having a flange thereon and secured to the end of the shaft, an annulus which is provided with a thrust receiving surface located at one side of the said flange, and a screw-thread on the other, a nut threaded to the annulus which is provided with a thrust-receiving surface, a cylindrical casing in which the annulus and nut are slidably mounted for axial movement, a splined connection between the casing and the annulus and an axially disposed screw which is threaded to the nut for adjusting it and the annulus with respect to the casing.

3. In combination, a shaft, a thrust member mounted on the end thereof, a casing surrounding it, an annulus slidably mounted in the bore of the casing and surrounding said member, a nut threaded to the annulus, means preventing the annulus from turning but permitting it to move axially in the casing, thrust bearings located on opposite sides of said member and between it and the nut and annulus, and an adjusting screw which is held against longitudinal movement in the casing and is threaded into the nut for moving it and the annulus longitudinally.

4. In combination, a shaft, a bearing therefor, a pillow-block for the bearing, a thrust member fixed to the end of the shaft beyond the bearing, a cylindrical casing for said member which is attached to the pillow-block, an annulus and a nut which embrace the thrust member and are slidably mounted in the casing, a splined connection between the annulus and the casing, rollers between said member and the annulus and the nut, and a screw threaded into the nut for moving said rollers axially and with them the shaft.

In witness whereof, I have hereunto set my hand this 11th day of September, 1907.

OSCAR JUNGGREN.

Witnesses:
 BENJAMIN B. HULL,
 MARGARET E. WOOLLEY.